(12) United States Patent
Xiao et al.

(10) Patent No.: US 9,179,374 B2
(45) Date of Patent: Nov. 3, 2015

(54) METHOD, APPARATUS, AND SYSTEM FOR CONTROLLING AND MEASURING CELL HANDOVER

(71) Applicant: Huawei Technologies Co., Ltd., Shenzhen, Guangdong (CN)

(72) Inventors: Dengkun Xiao, Beijing (CN); Jing Han, Beijing (CN); Yuxiang Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/204,784

(22) Filed: Mar. 11, 2014

(65) Prior Publication Data

US 2014/0194124 A1    Jul. 10, 2014

Related U.S. Application Data

(63) Continuation of application No. PCT/CN2012/081344, filed on Sep. 13, 2012.

(30) Foreign Application Priority Data

Sep. 13, 2011  (CN) .......................... 2011 1 0269232

(51) Int. Cl.
*H04W 36/00* (2009.01)
*H04L 25/03* (2006.01)
(Continued)

(52) U.S. Cl.
CPC .......... *H04W 36/0061* (2013.01); *H04L 25/03* (2013.01); *H04L 25/03949* (2013.01);
(Continued)

(58) Field of Classification Search
CPC ............ H04W 28/00; H04W 28/0226; H04W 28/0231; H04W 36/0016; H04W 36/0072; H04W 36/0077
USPC ................... 455/436–439, 450, 451; 370/331
See application file for complete search history.

(56) References Cited

U.S. PATENT DOCUMENTS

2009/0124261 A1* 5/2009 Shimomura ................... 455/436
2009/0156210 A1* 6/2009 Ponce De Leon et al. .... 455/436
(Continued)

FOREIGN PATENT DOCUMENTS

CN    101409577 A    4/2009
CN    101594606 A    12/2009
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP)(Release 10)," 3GPP TS 36.423, V10.2.0, pp. 1-130, 3rd Generation Partnership Project, Valbonne, France (Jun. 2011).
(Continued)

*Primary Examiner* — Wayne Cai
(74) *Attorney, Agent, or Firm* — Leydig, Voit & Mayer, Ltd.

(57) ABSTRACT

The present invention discloses a method, an apparatus, and a system for controlling and measuring a cell handover, where the method for controlling a cell handover includes: acquiring terminal information; and after a random access request sent by a terminal is received, performing, according to the terminal information, beamforming for a random access response corresponding to the random access request, and sending the random access response to the terminal, where the random access response includes: configuration information of a resource required by the terminal during communication after the terminal hands over from a source cell covered by a source base station to a target cell covered by a target base station. A success rate of performing a cell handover by the terminal is improved in embodiments of the present invention.

15 Claims, 5 Drawing Sheets

(51) Int. Cl.
  *H04W 74/08* (2009.01)
  *H04W 72/04* (2009.01)
  *H04W 16/28* (2009.01)

(52) U.S. Cl.
  CPC ...... *H04W36/0072* (2013.01); *H04W 36/0077* (2013.01); *H04W 16/28* (2013.01); *H04W 72/046* (2013.01); *H04W 74/0833* (2013.01)

(56) References Cited

U.S. PATENT DOCUMENTS

| | | |
|---|---|---|
| 2010/0027438 A1 | 2/2010 | Cai |
| 2010/0238846 A1* | 9/2010 | Xu et al. ............... 370/280 |
| 2010/0291940 A1* | 11/2010 | Koo et al. ............. 455/450 |
| 2011/0098048 A1 | 4/2011 | Zhang et al. |
| 2011/0183675 A1* | 7/2011 | Bae et al. ............. 455/436 |
| 2012/0087338 A1* | 4/2012 | Brandt et al. ......... 370/331 |
| 2012/0094666 A1* | 4/2012 | Awoniyi et al. ....... 455/435.1 |
| 2012/0115521 A1 | 5/2012 | Tong et al. |

FOREIGN PATENT DOCUMENTS

| | | |
|---|---|---|
| CN | 101873601 A | 10/2010 |
| CN | 101938773 A | 1/2011 |
| EP | 2285150 A1 | 2/2011 |
| EP | 2451090 A1 | 5/2012 |

OTHER PUBLICATIONS

"Consideration on the SI of HetNet mobility enhancements for LTE," 3GPP TSG-RAN WG2 Meeting #75, Athens, Greece, R2-114101, 3rd Generation Partnership Project, Valbonne, France (Aug. 22-26, 2011).

"DL Interference Mitigation via Direction Information in Het-Net," 3GPP TSG RAN WG1 Meeting #61 bis, Dresden, Germany, R1-103497, 3rd Generation Partnership Project, Valbonne, France (Jun. 28-Jul. 2, 2010).

* cited by examiner

METHOD, APPARATUS, AND SYSTEM FOR CONTROLLING AND MEASURING CELL HANDOVER

CROSS-REFERENCE TO RELATED APPLICATION

This application is a continuation of International Patent Application No. PCT/CN2012/081344, filed on Sep. 13, 2012, which claims priority to Chinese Patent Application No. 201110269232.3, filed on Sep. 13, 2011, both of which are hereby incorporated by reference in their entireties.

TECHNICAL FIELD

Embodiments of the present invention relate to the field of communications technologies, and in particular, to a method, an apparatus, and a system for controlling and measuring a cell handover.

BACKGROUND

On a Long Term Evolution Advanced (LTE-A for short) communications system, a Low Power Node (LPN for short) is introduced, where the low power node and a macro cell node together form a heterogeneous network. On the heterogeneous network, the main purposes of the low power node are: to enhance coverage, increase capacity, improve communication quality of an edge user, enhance group mobility and temporary network deployment, reduce costs, and the like. The introduction of the low power node changes an original typology of the communications system, and therefore it has a practical significance for studying new features in a heterogeneous network scenario.

A process of performing a cell handover by a terminal (also called a User Equipment, UE for short) is as follows: For example, a source macro cell node, that is, a source base station, sends a handover command to the terminal; after receiving the handover command, the terminal sends a random access request to a target macro cell node, that is, a target base station; the target base station receives the random access request sent by the terminal, allocates a resource required by the terminal during communication in a target macro cell to the terminal, and sends corresponding configuration information of the resource to the terminal by using a Random Access Response (RAR for short); and the terminal receives the RAR and performs resource reconfiguration for the target macro cell according to configuration information carried in the RAR, thereby completing a handover of the terminal from a source macro cell to the target macro cell.

For a co-channel Heterogeneous Network (Het-net for short), because a low power node is introduced, co-channel interference exists between a macro cell node and the low power node. Because of co-channel interference between a neighboring macro cell node and the low power node, a failure probability of RAR transmission is relatively high, which results in a relatively high failure rate of performing a cell handover by a terminal.

SUMMARY

Embodiments of the present invention provide a method, an apparatus, and a system for controlling and measuring a cell handover, so as to improve the success rate of performing a cell handover by a terminal.

An embodiment of the present invention provides a method for controlling a cell handover, including:
acquiring terminal information; and
after a random access request sent by a terminal is received, performing, according to the terminal information, beamforming for a random access response corresponding to the random access request, and sending the random access response to the terminal, where the random access response includes: configuration information of a resource required by the terminal during communication after the terminal hands over from a source cell covered by a source base station to a target cell covered by a target base station.

An embodiment of the present invention further provides another method for controlling a cell handover, including:
acquiring terminal information; and
sending the terminal information to a target base station, so that the target base station performs, according to the terminal information, beamforming for a random access response of a terminal that hands over from a source cell covered by a source base station to a target cell covered by the target base station.

An embodiment of the present invention further provides a method for measuring cell information, including:
receiving a measurement indication that is sent by a source base station and includes neighboring cell information; and
measuring precoding matrix indication information of a neighboring cell according to the neighboring cell information and sending the precoding matrix indication information to the source base station, where the neighboring cell includes a target cell.

An embodiment of the present invention further provides a base station, including:
an acquiring module, configured to acquire terminal information;
a processing module, configured to: after a random access request sent by a terminal is received, perform, according to the terminal information acquired by the acquiring module, beamforming for a random access response corresponding to the random access request; and
a sending module, configured to send the random access response for which beamforming has been performed by the processing module to the terminal, where the random access response includes: configuration information of a resource required by the terminal during communication after the terminal hands over from a source cell covered by a source base station to a target cell covered by a target base station.

An embodiment of the present invention further provides another base station, including:
an acquiring module, configured to acquire terminal information; and
a sending module, configured to send the terminal information acquired by the acquiring module to a target base station, so that the target base station performs, according to the terminal information, beamforming for a random access response of a terminal that hands over from a source cell covered by a source base station to a target cell covered by the target base station.

An embodiment of the present invention further provides a terminal, including:
a receiving module, configured to receive a measurement indication that is sent by a source base station and includes neighboring cell information;
a measuring module, configured to measure precoding matrix indication information of a neighboring cell according to the neighboring cell information included in the measurement indication received by the receiving module, where the neighboring cell includes a target cell; and a sending module, configured to send the precoding matrix indication information of the neighboring cell measured by the measuring module to the source base station.

An embodiment of the present invention further provides a communications system, including: the source base station and the target base station.

According to the method, the apparatus, and the system for controlling and measuring a cell handover that are provided in the embodiments of the present invention, in a process of performing a cell handover by a terminal, a target base station may perform, according to terminal information, beamforming for a random access response that carries configuration information of a resource required by the terminal during communication in a target cell, and send the random access response for which beamforming has been performed to the terminal. Because strength of signals transmitted to the terminal direction increases after beamforming is performed for the random access response according to the terminal information, transmission interference of the random access response can be effectively suppressed and a probability of correctly receiving the random access response by the terminal increases, thereby improving a success rate of performing a cell handover by the terminal.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Serial numbers of the following embodiments of the present invention are merely for description, but do not indicate preference of the embodiments.

Figure 1:
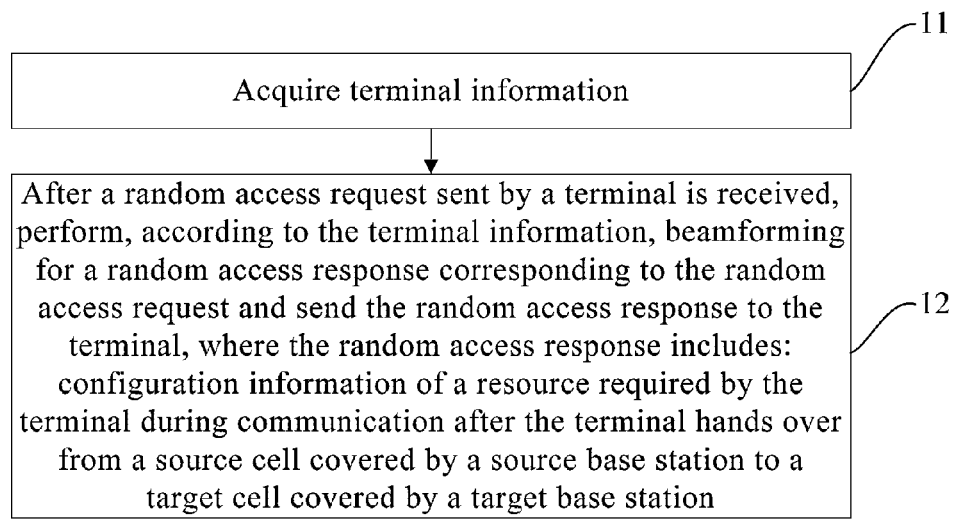
FIG. 1 is a flowchart of a method for controlling a cell handover according to Embodiment 1 of the present invention.

FIG. 1 is a flowchart of a method for controlling a cell handover according to Embodiment 1 of the present invention. This embodiment may be executed by a target base station, and the method shown in FIG. 1 includes:

Step 11: Acquire terminal information.

The terminal information includes: location information of a terminal and/or precoding matrix indication information of a target cell measured by the terminal. The location information of the terminal may be acquired in a manner of Global Positioning System (Global Positioning System, GPS for short) positioning, network positioning, or the like. Because a coverage area of a low power node is relatively narrow, location information of the low power node that serves the terminal may also be approximately used as the location information of the terminal.

Step 12: After a random access request sent by the terminal is received, perform, according to the terminal information, beamforming for a random access response corresponding to the random access request, and send the random access response to the terminal, where the random access response includes: configuration information of a resource required by the terminal during communication after the terminal hands over from a source cell covered by a source base station to a target cell covered by a target base station.

When the terminal receives a handover command sent by the source base station, the terminal sends the random access request to the target base station, where the request is used to request a handover from the source cell covered by the source base station to the target cell covered by the target base station. After receiving the random access request sent by the terminal, the target base station allocates a resource required by the terminal during communication in the target cell to the terminal and generates the random access response that carries the configuration information of the resource. Then, the target base station performs beamforming for the random access response according to the acquired terminal information, and sends the random access response for which beamforming has been performed according to the terminal information to the terminal.

In a process of performing a cell handover by a terminal in this embodiment, a target base station performs, according to terminal information, beamforming for a random access response that carries configuration information of a resource required by the terminal during communication in a target cell, and sends the random access response for which beamforming has been performed to the terminal. Because strength of signals transmitted in the terminal direction increases after beamforming is performed for the random access response according to the terminal information, transmission interference of the random access response can be effectively suppressed and a probability of correctly receiving the random access response by the terminal increases, thereby improving a success rate of performing a cell handover by the terminal.

Optionally, in the foregoing technical solution, the target base station may acquire the terminal information by receiving a handover request sent by the source base station. Further, the handover request sent by the source base station may further include: information about a low power node that is located in the source cell and serves the terminal. In this situation, before the target base station performs beamforming for the random access response, the target base station may allocate, to the terminal according to the information about the low power node that serves the terminal, the resource required by the terminal during communication after the terminal hands over to the target cell, which helps reduce co-channel interference and improves accuracy of resource scheduling performed by the target base station for the terminal that hands over to the target cell.

Figure 2:
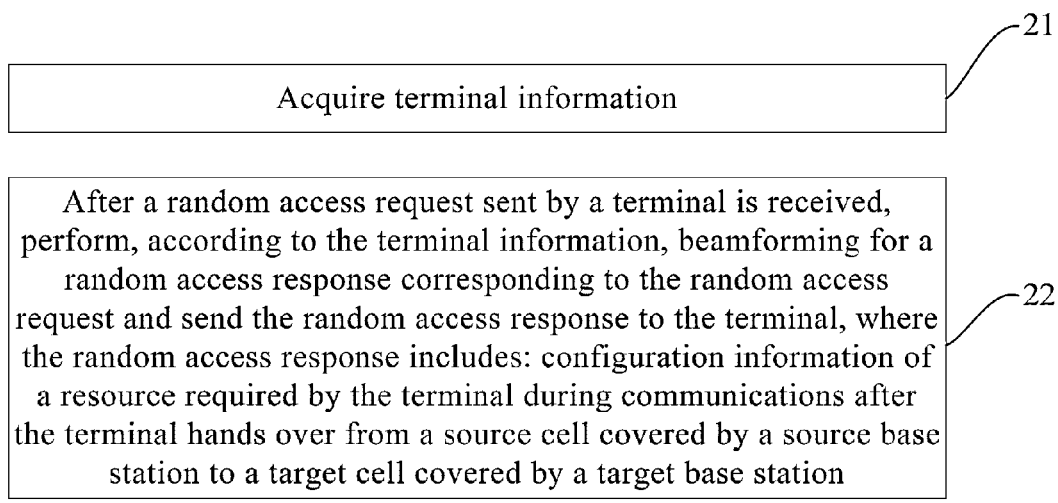
FIG. 2 is a flowchart of a method for controlling a cell handover according to Embodiment 2 of the present invention.

FIG. 2 is a flowchart of a method for controlling a cell handover according to Embodiment 2 of the present invention. This embodiment may be executed by a source base station, and the method shown in FIG. 2 includes:

Step 21: Acquire terminal information.

The terminal information includes: location information of a terminal and/or precoding matrix indication information of a target cell measured by the terminal.

The location information of the terminal may be acquired in a manner of GPS positioning, network positioning, or the like. Because a coverage area of a low power node is relatively narrow, location information of the low power node that serves the terminal may also be approximately used as the location information of the terminal.

The precoding matrix indication information of the target cell may be measured by the terminal instructed by a source base station. For example, before sending the precoding matrix indication information of the target cell to a target base station, the source base station may send a measurement indication that includes neighboring cell information to the terminal, where the measurement indication is used to instruct the terminal to measure precoding matrix indication information of a neighboring cell; and the source base station receives the precoding matrix indication information of the neighboring cell measured by the terminal, where the neighboring cell includes the target cell.

Step 22: Send the terminal information to the target base station, so that the target base station performs, according to the terminal information, beamforming for a random access response of a terminal that hands over from a source cell covered by the source base station to the target cell covered by the target base station.

In a process of performing a cell handover by a terminal in this embodiment, a source base station sends terminal information to a target base station, so that when the terminal initiates a request for randomly accessing a target cell, the target base station may perform, by using the terminal information, beamforming for a random access response that carries configuration information of a resource required by the terminal during communication in the target cell, and send the random access response for which beamforming has been performed to the terminal. Because strength of signals transmitted in the terminal direction increases after beamforming is performed for the random access response, transmission interference of the random access response can be effectively suppressed and a probability of correctly receiving the random access response by the terminal increases, thereby improving a success rate of performing a cell handover by the terminal.

Optionally, in the foregoing technical solution, the source base station may carry the location information of the terminal in a handover request, send the handover request to the target base station, and so on. Further, the handover request sent by the source base station may further include: information about a low power node that is located in the source cell and serves the terminal. In this situation, before the target base station performs beamforming for the random access response, the target base station may allocate, to the terminal according to the information about the low power node that serves the terminal, the resource required by the terminal during communication after the terminal hands over to the target cell, which improves accuracy of resource scheduling performed by the target base station for the terminal that hands over to the target cell.

Figure 3:
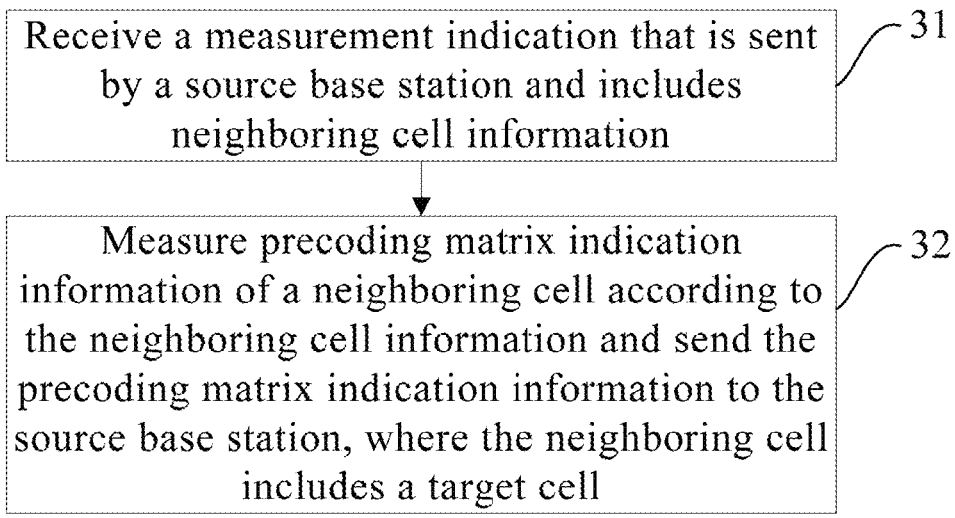
FIG. 3 is a flowchart of a measurement method according to Embodiment 3 of the present invention.

FIG. 3 is a flowchart of a measurement method according to Embodiment 3 of the present invention. This embodiment may be executed by a terminal, and the method shown in FIG. 3 includes:

Step 31: Receive a measurement indication that is sent by a source base station and includes neighboring cell information.

When receiving the measurement indication that includes the neighboring cell information, a terminal determines that it is necessary to measure Precoding Matrix Indication (PMI for short) information of a neighboring cell.

Step 32: Measure the precoding matrix indication information of the neighboring cell according to the neighboring cell information and send the precoding matrix indication information to the source base station, where the neighboring cell includes a target cell.

The terminal sends a measurement report to the source base station, where the measurement report includes the PMI information of the neighboring cell currently measured by the terminal, and the PMI information of the neighboring cell measured by the terminal includes: PMI information of the target cell.

In the measurement method provided in this embodiment, a terminal measures, according to a measurement indication of a source base station, PMI information of a neighboring cell that includes a target cell, and reports a measurement report to the source base station. When determining that the terminal needs to hand over from a source cell to a target cell covered by a target base station, the source base station may send PMI information of the target cell currently measured by the terminal to the target base station, so that the target base station performs, according to the PMI information, beamforming for a random access response to be sent to the terminal, thereby suppressing interference in a process of transmitting the random access response, and improving a success rate of performing a cell handover by the terminal.

Figure 4:
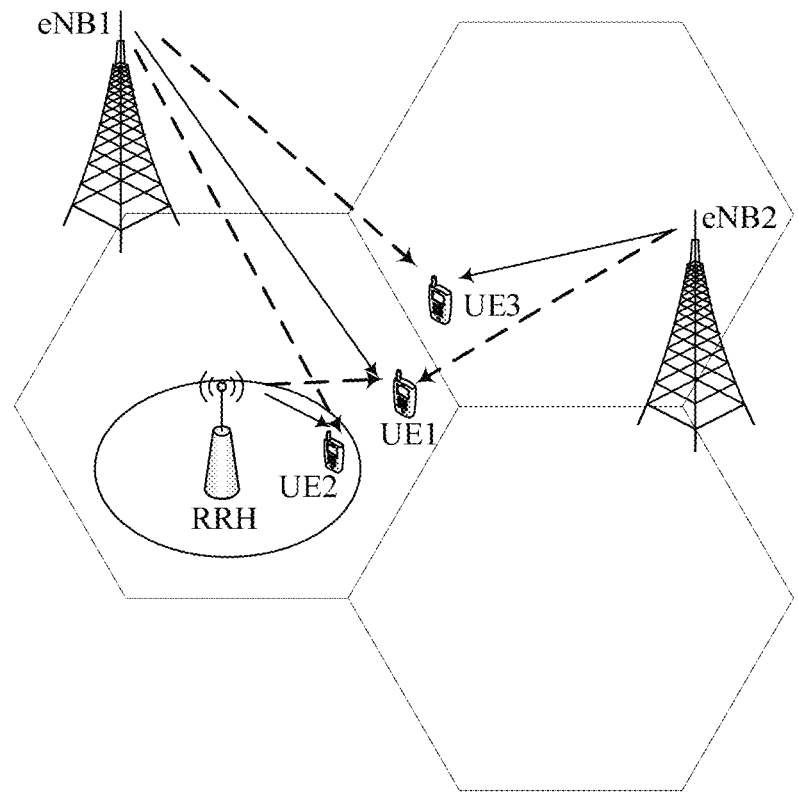
FIG. 4 is a schematic diagram of a heterogeneous network of an LTE-A communications system in an application scenario according to an embodiment of the present invention.

FIG. 4 is a schematic diagram of a heterogeneous network of an LTE-A communications system in an application scenario according to an embodiment of the present invention. On the LTE-A communications system, a macro cell node and a low power node may form a co-channel heterogeneous network, where the macro cell node is a base station, specifically such as an evolved base station (E-UTRAN NodeB, eNB for short), and the low power node may be a Remote Radio Header (RRH for short), a Repeater, or the like. On the co-channel heterogeneous network, center frequencies transmitted by all base stations, such as all eNBs, are the same, cell ranges covered by all base stations, such as all eNBs, are the same, the low power node is located in a cell covered by an eNB, and coverage of the low power node is smaller than coverage of the eNB. Interference exists on the co-channel heterogeneous network. For example, in FIG. 4, a solid arrow indicates signals sent by a serving cell of a UE, and a dashed arrow indicates interference introduced by a neighboring cell. Because of the impact of the interference, a failure probability of performing a cell handover by the UE is relatively high in the prior art. A success rate of performing a cell handover by the UE can be increased by using the technical solution provided in this embodiment of the present invention. With reference to the heterogeneous network shown in FIG. 4 and with reference to FIG. 5 or FIG. 6, the following describes in detail the technical solutions provided in the embodiments of the present invention.

Figure 5:
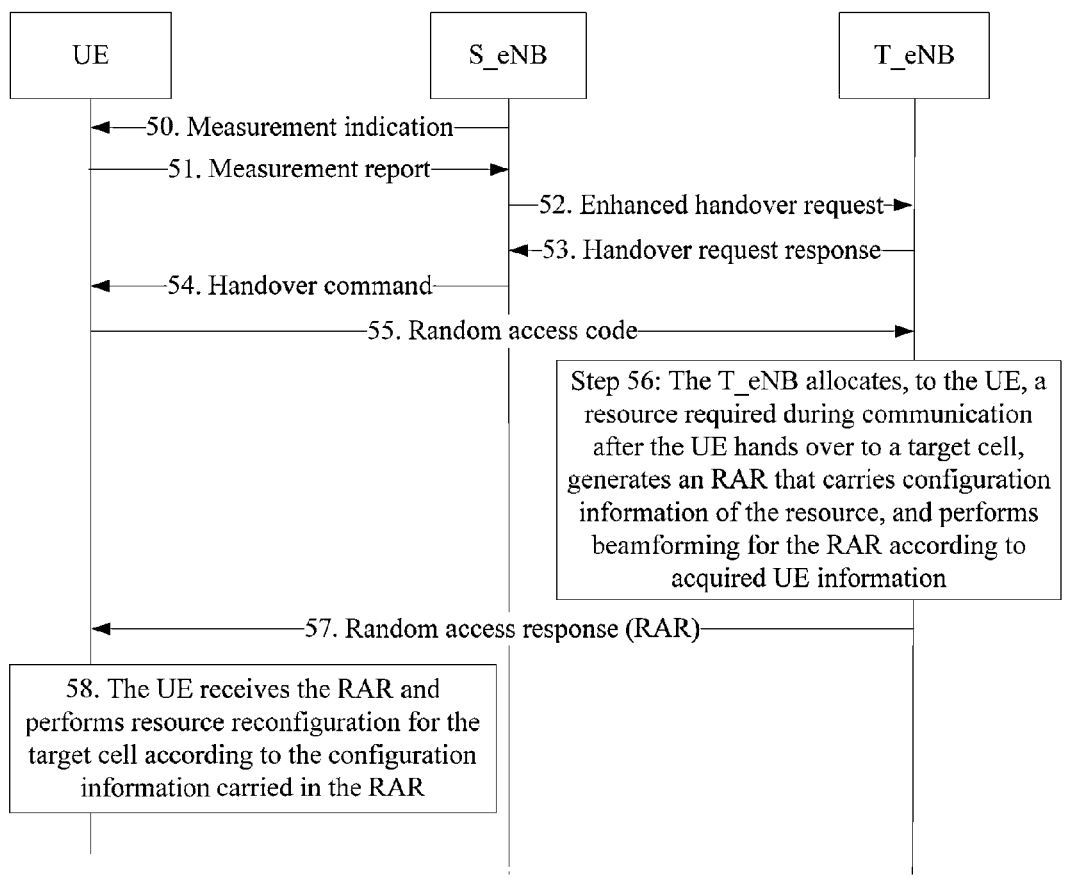
FIG. 5 is a signaling interaction diagram of a method for controlling a cell handover according to Embodiment 4 of the present invention.

FIG. 5 is a signaling interaction diagram of a method for controlling a cell handover according to Embodiment 4 of the present invention. In an application scenario in this embodiment, a UE needs to perform an inter-cell handover, that is, the UE needs to hand over from a source cell covered by a source eNB (indicated as S_eNB) to a target cell covered by a target eNB (indicated as T_eNB). As shown in FIG. 4 and FIG. 5, the method for controlling a cell handover provided in this embodiment includes:

Step 50: The S_eNB sends a measurement indication to the UE.

The measurement indication sent by the S_eNB to the UE includes neighboring cell information and is used to instruct the UE to measure PMI information of a neighboring cell according to the neighboring cell information, where the neighboring cell includes a target cell to which the UE needs to hand over.

Step 51: The UE sends a Measurement Report to the S_eNB.

The UE receives the measurement indication sent by the S_eNB, measures the PMI information of the neighboring cell according to the neighboring cell information included in the measurement indication, and sends the measurement report to the S_eNB.

The measurement report sent by the UE to the S_eNB may include: location information of the UE and/or the PMI information of the neighboring cell measured by the UE.

Step 52: The S_eNB sends an Enhanced Handover Request to the T_eNB, where the enhanced handover request includes UE information, and the UE information includes: the location information of the UE and/or a PMI information of the target cell measured by the UE.

Optionally, the enhanced handover request may further include: information about a low power node that is located in the source cell and serves the UE, where the information about the low power node that serves the UE may include but is not limited to: an identifier of an RRH that serves the UE or an identifier of a repeater that serves the UE.

Table 1 is an example of a signaling format of the enhanced handover request. The enhanced handover request listed in Table 1 is obtained based on a signaling format of an existing handover request and by extension in a manner of adding a new Information Element (IE for short).

TABLE 1

| Information Element/ Group Name (IE/Group Name) | Presence (Presence) | Range (Range) | IE Type and Reference (IE type and reference) | Semantics Description (Semantics description) | Criticality (Criticality) | Assigned Criticality (Assigned Criticality) |
|---|---|---|---|---|---|---|
| Message type (Message Type) | M | | 9.2.13 | | YES | reject |
| ... | | | | | | |
| UE context information (UE Context Information) | | 1 | | | YES | reject |
| >MME UE service access point ID (MME UE S1AP ID) | M | | Integer (INTEGER) $(0 \ldots 2^{32} - 1)$ | MME UE S1AP ID allocated by an MME | — | — |
| >*UE information (UE information)* | | | | | | |
| >>*Location information of a UE (UE Coordinate)* | *M/O* | | | | | |
| >>*Identifier of a low power node that serves a UE (Serving UE RRH ID or Repeater ID)* | *M/O* | | | | | |
| >>*PMI* | *M/O* | | | | | |
| ... | | | | | | |

In the example of the signaling format of the enhanced handover request listed in Table 1, presence "M" indicates a mandatory information element, and presence "O" indicates an optional information element; and "UE information" in italic is newly-added content of an information element that is named "UE context information", where the newly-added content "UE information" may include the following information elements:

Location information of a UE (UE Coordinate): The location information of a UE may be acquired by using a GPS positioning method or a network positioning method, and location information of a low power node that serves the UE may also be approximately used as the location information of the UE;

Identifier of a low power node that serves a UE (Serving UE RRH ID or Repeater ID): is a mandatory information element, where the identifier of the low power node that serves the UE is, for example, an identifier of a low power node, such as an RRH or a repeater, that provides, in a source cell, a service for the UE, and because coverage of the low power node is relatively small, location information of the low power node that serves the UE may also be approximately used as the location information of the UE.

PMI: indicates PMI information of a target cell.

The T_eNB receives the enhanced handover request and saves the UE information carried in the enhanced handover request.

Table 1 is merely an optional example of the format of the enhanced handover request, and should not be understood as a limitation to the technical solution of the present invention. Optionally, in the enhanced handover request, the S_eNB may further carry other information of the low power node that serves the UE, such as location information and radio frequency information, in the enhanced handover request and send the enhanced handover request to the T_eNB.

Step 53: The T_eNB sends a handover request response (also Handover Request ACK) to the S_eNB.

Step 54: The S_eNB sends a Handover Command to the UE.

The S_eNB instructs, by sending the handover command to the UE, the UE to hand over from the source cell to the target cell. The handover command may include but is not limited to: measurement information and location information of a cell covered by the T_eNB.

Step 55: The UE sends a random access preamble (RA Premable) to the T_eNB.

When receiving the handover command sent by the S_eNB, the UE sends a random access request to the T_eNB, where the random access request includes the random access code and is used to request to access the target cell.

Step 56: The T_eNB allocates, to the UE, a resource required during communication after the UE hands over to the target cell, generates an RAR that carries configuration information of the resource, and performs beamforming for the RAR according to acquired UE information.

Optionally, if the UE information acquired by the T_eNB in step 52 includes the identifier of the low power node that serves the UE, the T_eNB may allocate, to the UE according to information about a resource currently used by a low power node corresponding to the identifier of the low power node that serves the UE, the resource required during communication after the UE hands over to the target cell, thereby helping reduce co-channel interference. Information about the low power node that serves the UE, such as location information, radio frequency information, and other used resource information of the low power node, may be acquired by using, but not limited to, the following manners: The S_eNB notifies the T_eNB of the information in the handover request, or, the T_eNB acquires the information from an MME, or, for example, the information is acquired by using a method shown in Embodiment 5 in the following. A reason for reducing co-channel interference in this embodiment is as follows: For example, a low power node is generally distributed on a cell edge, and a UE generally requires a relatively short time (such as a millisecond level) to perform a cell handover, and therefore after the UE hands over from a source cell to a target cell, a distance between the UE and a low power node that originally serves the UE is relatively short; and when a T_eNB allocates a resource to the UE, a resource block allocated to the UE is different from a resource block currently used by the low power node that originally serves the UE, so that frequency separation between a resource used by the UE during communication and a resource used by the low power node that originally serves the UE is relatively large, thereby reducing co-channel interference caused by the low power node that originally serves the UE to the UE, and improving accuracy of interference coordination. Optionally, if the UE information acquired by the T_eNB in step 52 includes: the location information of the UE and/or the PMI information of the target cell measured by the UE, the T_eNB performs beamforming for the RAR according to the location information of the UE and/or the PMI information of the target cell measured by the UE, where the RAR carries the configuration information of the resource that is allocated by the T_eNB to the UE and is required during communication after the UE hands over to the target cell.

Optionally, if the UE information acquired by the T_eNB in step 52 does not include the location information of the UE, but includes the identifier of the low power node that serves the UE, the T_eNB may determine, in pre-acquired information about the low power node, location information of a low power node corresponding to the identifier. Because coverage of the low power node is relatively small, the T_eNB may approximately use location information of the low power node that serves the UE as the location information of the UE. In this situation, the T_eNB may perform beamforming for the RAR according to the location information of the low power node that serves the UE and/or the PMI information of the target cell measured by the UE.

Step 57: The T_eNB sends the RAR for which beamforming has been performed to the UE.

Step 58: The UE receives the RAR and performs resource reconfiguration for the target cell according to the configuration information carried in the RAR; and end a random access process of the UE.

Figure 6:
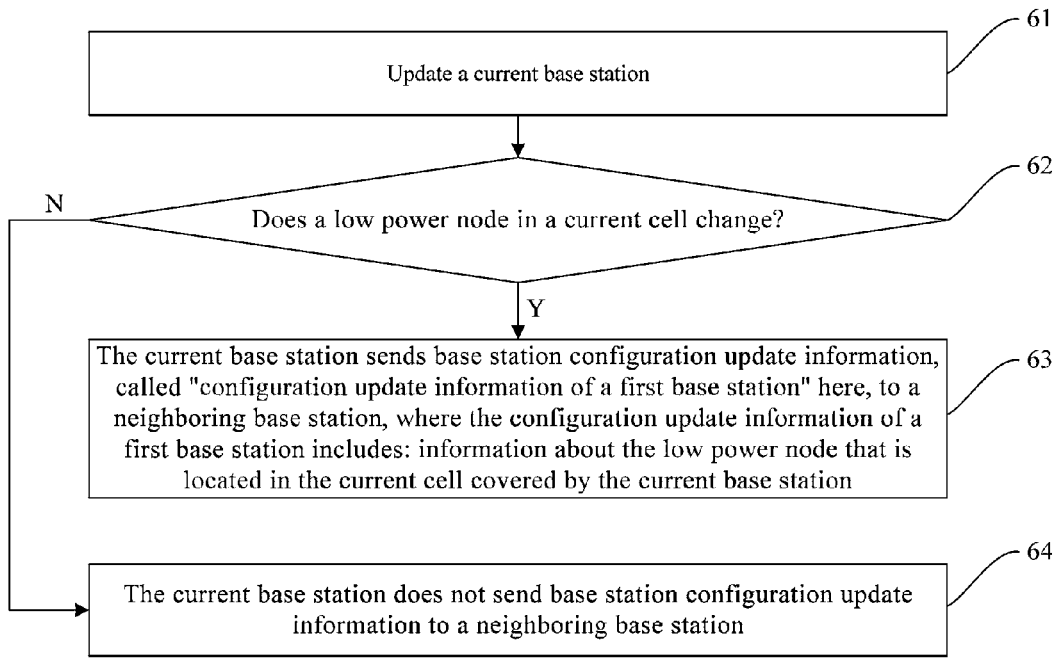
FIG. 6 is a flowchart of a method for acquiring information about a low power node according to Embodiment 5 of the present invention.

FIG. 6 is a flowchart of a method for acquiring information about a low power node according to Embodiment 5 of the present invention. This embodiment is executed by any base station, such as any eNB on the heterogeneous network shown in FIG. 4. The method shown in FIG. 6 includes:

Step 61: Update a current base station, for example, add or reduce a network element in coverage of the current base station.

Step 62: Determine whether a low power node in a current cell covered by the current base station changes; if yes, perform step 63; and otherwise, perform step 64.

Step 63: The current base station sends base station configuration update information, called "first base station configuration update information" here, to a neighboring base station, where the first base station configuration update information includes: information about the low power node that is located in the current cell covered by the current base station; and ends the process.

The information about the low power node may include but is not limited to: an identifier of the low power node, radio frequency information of the low power node, location information of the low power node, and the like. The information about the low power node that is located in the cell covered by the current base station may be carried in a signaling format of the base station configuration update information, and be sent by the current base station to the neighboring base station.

Step 64: The current base station does not send base station configuration update information to a neighboring base station; and end the process.

Alternatively, the current base station may also receive base station configuration update information, called "second base station configuration update information" here, sent by the neighboring base station, where the second base station configuration update information includes: information about a low power node that is located in a neighboring cell covered by the neighboring base station.

The first base station configuration update information and the second base station configuration update information may be obtained based on a signaling format of existing base station configuration update information and by extending content of an information element that is named "served cell information". Table 2 is an example of the signaling format of the base station configuration update information.

TABLE 2

| Information Element/ Group Name (IE/Group Name) | Presence (Presence) | Range (Range) | IE Type and Reference (IE type and reference) | Semantics Description (Semantics description) | Criticality (Criticality) | Assigned Criticality (Assigned Criticality) |
|---|---|---|---|---|---|---|
| Message type (Message Type) | M | | 9.2.13 | | YES | reject |
| Served Cells To Add | | | 0 to maxcellineNB | | GLOBAL | reject |
| >*Served cell information* (Served Cell Information) | M/O | | 9.2.8 | | — | — |
| >Neighbour Information . . . | | | 0 to maxnoofNeighbours | | — | — |

Table 3 is an example of a format of an extended "served cell information" information element. An information element listed in Table 3 may be newly added to the "served cell information" information element listed in Table 2, so as to carry the information about the low power node that is located in the cell covered by the current base station, such as carry information about an RRH or information about a repeater in the cell covered by the current base station.

TABLE 3

| Information Element/ Group Name (IE/Group Name) | Presence (Presence) | Range (Range) | IE Type and Reference (IE type and reference) | Semantics Description (Semantics description) | Criticality (Criticality) | Assigned Criticality (Assigned Criticality) |
|---|---|---|---|---|---|---|
| . . . | | | | | | |
| >*RRH-ID* | *M/O* | | | | | |
| >>*RRH EARFCN* | *M/O* | | | | | |
| >>*RRH Coordinate* | *M/O* | | | | | |
| >*Repeater-ID* | *M/O* | | | | | |
| >>*Repeater EARFCN* | *M/O* | | | | | |
| >>*Repeater Coordinate* . . . | *M/O* | | | | | |

In the example of a signaling format of an enhanced "served cell information" information element listed in Table 3, presence "M" indicates a mandatory information element, and presence "O" indicates an optional information element; and italics are newly-added content of an information element that is named "served cell information", where the newly-added content "UE information" may include the following information elements:

"RRH-ID": indicates a cell identifier number of a remote radio header; and

"Repeater-ID": indicates a cell identifier number of a repeater (Reapter).

The information element that is named "RRH-ID" may further include the following information elements:

"RRH EARFCN": indicates radio frequency information of the RRH, such as an E-UTRA absolute radio frequency channel number of the RRH; and "RRH Coordinate": indicates location information of the RRH, such as coordinate information of the RRH.

The information element that is named "Repeater-ID" may further include the following information elements:

"Repeater EARFCN": indicates radio frequency information of the repeater, such as an E-UTRA absolute radio frequency channel number of the repeater; and "Repeater Coordinate": indicates location information of the repeater, such as coordinate information of the repeater.

Table 2 and Table 3 list merely an optional example of a format of the base station configuration update information and should not be understood as a limitation to the technical solution of the present invention.

In the method provided in this embodiment, during transmission of base station configuration update information, information about a low power node that is located in a cell covered by a base station is added, so that in a process of controlling an inter-cell handover performed by a terminal, the base station is capable of performing interference coordination for a handover of the terminal from a current cell to a neighboring cell according to acquired information about a low power node in the neighboring cell.

For example, an optional implementation manner is as follows: In a process of handing over from a source cell to a target cell by a terminal shown in FIG. 4 or FIG. 5, after acquiring an identifier of a low power node that is in the source cell and serves the terminal, a target base station may allocate, to the terminal according to information about a low power node corresponding to the identifier, such as location information and used resource information of the low power node, a resource that is different from a resource used by the low power node, so that frequency separation between a resource used by the terminal after the terminal hands over to the target cell and a resource used by the low power node is relatively large, thereby reducing co-channel interference caused by the low power node to the terminal, and improving accuracy of interference coordination.

Figure 7:
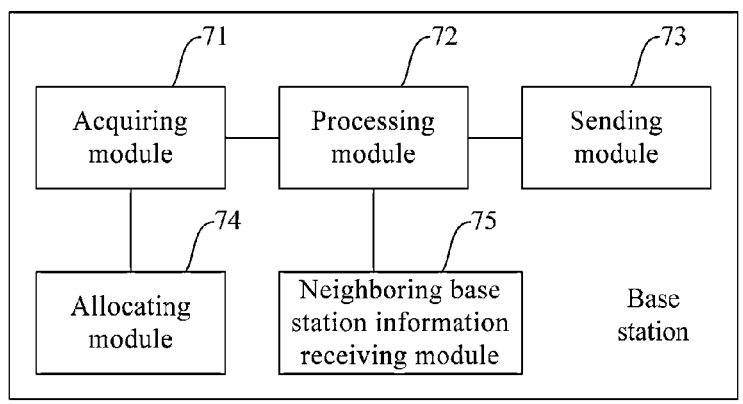
FIG. 7 is a schematic structural diagram of a base station according to Embodiment 6 of the present invention.

FIG. 7 is a schematic structural diagram of a base station according to Embodiment 6 of the present invention. As shown in FIG. 7, the base station provided in this embodiment includes: an acquiring module 71, a processing module 72, and a sending module 73.

The acquiring module 71 may be configured to acquire terminal information. The terminal information may include but is not limited to: location information of a terminal and/or precoding matrix indication information of a target cell measured by the terminal.

The processing module 72 may be configured to: after a random access request sent by the terminal is received, perform, according to the terminal information acquired by the acquiring module 71, beamforming for a random access response corresponding to the random access request.

The sending module 73 may be configured to send the random access response for which beamforming has been performed by the processing module 72 to the terminal, where the random access response includes: configuration information of a resource required by the terminal during communication after the terminal hands over from a source cell covered by a source base station to a target cell covered by a target base station.

According to a difference of a manner of acquiring the terminal information, optionally, the acquiring module 71 may specifically be configured to acquire the terminal information according to a received handover request that is sent by the source base station and includes the terminal information.

The handover request may further include: information about a low power node that is located in the source cell and serves the terminal. In this situation, the base station may further include: an allocating module 74. The allocating module 74 may be configured to: before the processing module performs beamforming for the random access response, allocate, to the terminal according to the information about the low power node that serves the terminal, the resource required by the terminal during communication after the terminal hands over to the target cell.

Optionally, the base station may further include: a neighboring base station information receiving module 75. The neighboring base station information receiving module 75 is configured to receive first base station configuration update information sent by a neighboring base station, where the first base station configuration update information includes: information about a low power node that is currently located in a neighboring cell covered by the neighboring base station; and/or the sending module 73 included in the base station may further be configured to: when information about a low power node that is located in a current cell changes, send second base station configuration update information to the neighboring base station, where the second base station configuration update information includes: the information about the low power node that is currently located in the current cell. After any base station acquires information about a low power node in a neighboring cell covered by a neighboring base station, in a process of controlling an inter-cell handover of a terminal, the base station is capable of performing, according to the acquired information about the low power node in the neighboring cell, interference coordination for a handover of the terminal from a current cell to the neighboring cell, thereby helping reduce co-channel interference, and improving accuracy of interference coordination.

The base station provided in this embodiment may be represented as a target base station to which a terminal hands over. The base station provided in this embodiment performs, according to terminal information, beamforming for a random access response that carries configuration information of a resource required by the terminal during communication in a target cell, and sends the random access response for which beamforming has been performed to the terminal. Because strength of signals transmitted in the terminal direction increases after beamforming is performed for the random access response according to the terminal information, transmission interference of the random access response can be effectively suppressed, and a probability of correctly receiving the random access response by the terminal increases, thereby improving a success rate of performing a cell handover by the terminal. For a working mechanism of the base station provided in this embodiment, reference may be made to records in FIG. 1 and FIG. 6, and records about the target base station in FIG. 5, and therefore no further details are provided herein.

Figure 8:
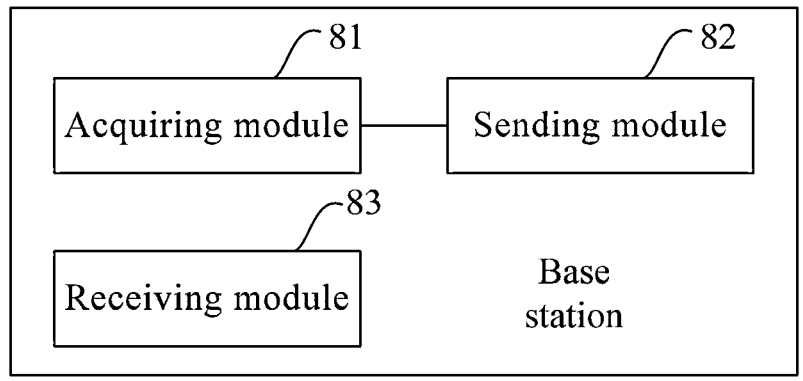
FIG. 8 is a schematic structural diagram of a base station according to Embodiment 7 of the present invention.

FIG. 8 is a schematic structural diagram of a base station according to Embodiment 7 of the present invention. As shown in FIG. 8, the base station provided in this embodiment includes: an acquiring module 81 and a sending module 82.

The acquiring module 81 may be configured to acquire terminal information. The terminal information may include but is not limited to: location information of a terminal and/or precoding matrix indication information of a target cell measured by the terminal.

The sending module 82 may be configured to send the terminal information acquired by the acquiring module 81 to a target base station, so that the target base station performs, according to the terminal information, beamforming for a random access response of a terminal that hands over from a source cell covered by a source base station to a target cell covered by the target base station.

According to a difference of a manner of sending the terminal information, optionally, the sending module 82 may specifically be configured to send a handover request to the target base station, where the handover request includes the terminal information.

Optionally, the base station may further include a receiving module 83.

In an optional implementation manner, the handover request may further include: information about a low power node that is located in the source cell and serves the terminal. The sending module 82 may further be configured to send a measurement indication that includes neighboring cell information to the terminal, where the measurement indication is used to instruct the terminal to measure precoding matrix indication information of a neighboring cell. The receiving module 83 may be configured to receive the precoding matrix indication information of the neighboring cell measured by the terminal, where the neighboring cell includes the target cell.

In another optional implementation manner, the sending module 82 may further be configured to: when information about a low power node that is located in a current cell changes, send second base station configuration update information to a neighboring base station, where the second base station configuration update information includes: the information about the low power node that is currently located in the current cell; and/or, the receiving module 83 is configured to receive first base station configuration update information that is sent by the neighboring base station, where the first base station configuration update information includes: information about a low power node that is currently located in a neighboring cell covered by the neighboring base station. After any base station acquires information about a low power node in a neighboring cell covered by a neighboring base station, in a process of controlling an inter-cell handover of a terminal, the base station is capable of performing, according to the acquired information about the low power node in the neighboring cell, interference coordination for a handover of the terminal from a current cell to the neighboring cell, thereby helping reduce co-channel interference, and improving accuracy of interference coordination.

The base station provided in this embodiment may be represented as a source base station from which a terminal hands over. In a process of performing a cell handover by a terminal, the base station provided in this embodiment may send terminal information to a target base station, so that when the terminal initiates a request for randomly accessing a target cell, the target base station may perform, by using the terminal information, beamforming for a random access response that carries configuration information of a resource required by the terminal during communication in the target cell, and send the random access response for which beamforming has been performed to the terminal. Because strength of signals transmitted in the terminal direction increases after beamforming is performed for the random access response, transmission interference of the random access response can be effectively suppressed and a probability of correctly receiving the random access response by the terminal increases, thereby improving a success rate of performing a cell handover by the terminal. For a working mechanism of the base station provided in this embodiment, reference may be made to records in FIG. 2 and FIG. 6, and records about the source base station in FIG. 5, and therefore no further details are provided herein.

Figure 9:
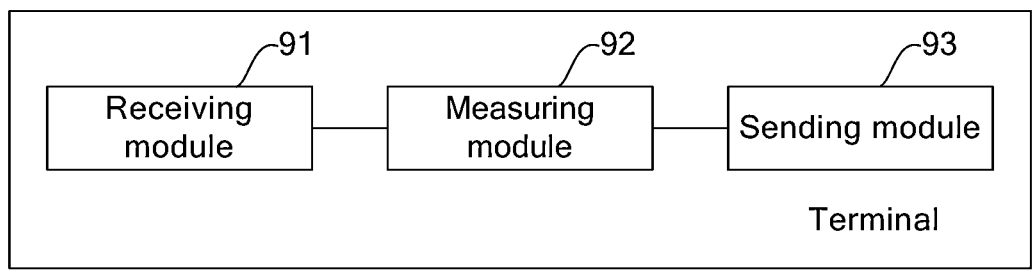
FIG. 9 is a schematic structural diagram of a terminal according to Embodiment 8 of the present invention.

FIG. 9 is a schematic structural diagram of a terminal according to Embodiment 8 of the present invention. As shown in FIG. 9, the terminal provided in this embodiment includes: a receiving module 91, a measuring module 92, and a sending module 93.

The receiving module 91 may be configured to receive a measurement indication that is sent by a source base station and includes neighboring cell information.

The measuring module 92 may be configured to measure precoding matrix indication information of a neighboring cell according to the neighboring cell information included in the measurement indication received by the receiving module, where the neighboring cell includes a target cell.

The sending module 93 may be configured to send PMI information of the neighboring cell measured by the measuring module to the source base station.

The terminal provided in this embodiment may measure, according to a measurement indication of a source base station, PMI information of a neighboring cell that includes a target cell, and report a measurement report to the source base station. When determining that the terminal needs to hand over from a source cell to a target cell covered by a target base station, the source base station may send PMI information of the target cell currently measured by the terminal to the target base station, so that the target base station performs, according to the PMI information, beamforming for a random access response to be sent to the terminal, thereby suppressing interference in a process of transmitting the random access response, and improving a success rate of performing a cell handover by the terminal. For a working mechanism of the terminal provided in this embodiment, reference may be made to records in FIG. 3, and records about the terminal in FIG. 4 and FIG. 5, and therefore no further details are provided herein.

Figure 10:
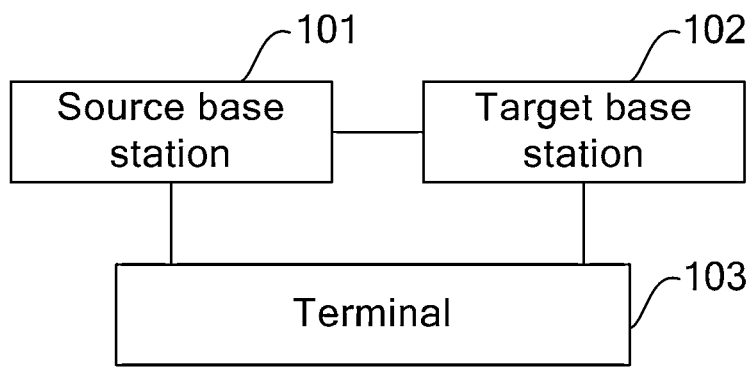
FIG. 10 is a schematic structural diagram of a communications system according to Embodiment 9 of the present invention.

FIG. 10 is a schematic structural diagram of a communications system according to Embodiment 9 of the present invention. As shown in FIG. 10, the communications system provided in this embodiment includes: a source base station 101 and a target base station 102, where the source base station 101 is communicationally connected to the target base station 102. For a structure of the source base station 101, reference may be made to records in the embodiment corresponding to FIG. 7, and for a working mechanism of the source base station 101, reference may be made to records in FIG. 1 and FIG. 6; for a structure of the target base station 102, reference may be made to records in the embodiment corresponding to FIG. 8, and for a working mechanism of the target base station 102, reference may be made to records in FIG. 2 and FIG. 6. Therefore, no further details are provided herein.

Optionally, the communications system may further include: a terminal 103, where the terminal 103 is communicationally connected to the source base station 101 and the target base station 102 respectively. For a structure of the terminal 103, reference may be made to records in the embodiment corresponding to FIG. 9; and for communication interaction processes between the source base station 101, the target base station 102, and the terminal 103, reference may be made to records in the embodiment corresponding to FIG. 5. Therefore, no further details are provided herein.

On the communications system provided in this embodiment, in a process of performing a cell handover by a terminal, a target base station may perform, according to terminal information, beamforming for a random access response that carries configuration information of a resource required by the terminal during communication in a target cell, and send the random access response for which beamforming has been performed to the terminal. Because strength of signals transmitted in the terminal direction increases after beamforming is performed for the random access response according to the terminal information, transmission interference of the random access response can be effectively suppressed and a probability of correctly receiving the random access response by the terminal increases, thereby improving a success rate of performing a cell handover by the terminal.

It may be understood by persons of ordinary skill in the art that the accompanying drawings are merely schematic diagrams of the embodiments, and modules or flows in the accompanying drawings are not necessarily required for implementing the present invention.

Persons of ordinary skill in the art may understand that modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of sub-modules.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, as long as such modifications or replacements do not cause the essence of corresponding technical solutions to depart from the spirit and scope of the technical solutions of the embodiments of the present invention.

What is claimed is:

1. A method for controlling a cell handover, comprising:
    acquiring terminal information according to a received handover request that includes information about a low power node that is located in a source cell and serves the terminal; and
    after a random access request sent by a terminal is received, performing, according to the terminal information, beamforming for a random access response corresponding to the random access request, and sending the random access response to the terminal, wherein:
    the random access response comprises: configuration information of a resource required by the terminal during communication after the terminal hands over from the source cell covered by a source base station to a target cell covered by a target base station;
    wherein the terminal information comprises at least one of the following: (a) location information of the terminal and (b) precoding matrix indication information of the target cell measured by the terminal.

2. The method according to claim 1, wherein the received handover request is sent by the source base station and comprises the terminal information.

3. The method according to claim 2, wherein before the performing beamforming for the random access response, the method further comprises:
    allocating, to the terminal according to the information about the low power node that serves the terminal, the resource required by the terminal during communication after the terminal hands over to the target cell.

4. The method according to claim 1, wherein the method further comprises at least one of the following:
    (a) receiving first base station configuration update information sent by a neighboring base station, wherein the first base station configuration update information comprises: information about a low power node that is currently located in a neighboring cell covered by the neighboring base station;
    and (b) when the information about the low power node that is located in a current cell changes, sending second base station configuration update information to the neighboring base station, wherein the second base station configuration update information comprises: current information about the low power node that is currently located in the current cell.

5. A method for controlling a cell handover, comprising:
    acquiring terminal information; and
    sending a handover request including the terminal information to a target base station, to enable the target base station to perform, according to the terminal information, beamforming for a random access response of a terminal that hands over from a source cell covered by a source base station to a target cell covered by the target base station, wherein the handover request further includes information about a low power node that is located in the source cell and serves the terminal;
    wherein the terminal information comprises at least one of the following: (a) location information of the terminal and (b) precoding matrix indication information of the target cell measured by the terminal.

6. The method according to claim 5, wherein before the sending precoding matrix indication information of the target cell measured by the terminal to the target base station, the method further comprises:
    sending a measurement indication that comprises neighboring cell information to the terminal, wherein the measurement indication is used to instruct the terminal to measure precoding matrix indication information of a neighboring cell; and
    receiving the precoding matrix indication information of the neighboring cell measured by the terminal, wherein the neighboring cell comprises the target cell.

7. The method according to claim 5, wherein the method further comprises at least one of the following:
    (a) receiving first base station configuration update information sent by a neighboring base station, wherein the first base station configuration update information comprises: information about a low power node that is currently located in a neighboring cell;
    and
    (b) when information about the low power node that is located in a current cell changes, sending second base station configuration update information to the neighboring base station, wherein the second base station configuration update information comprises: current information about the low power node that is currently located in the current cell.

8. A base station, comprising:
    an acquirer, configured to acquire terminal information according to a received handover request that includes information about a low power node that is located in a source cell and serves a terminal;
    a processor, configured to: after a random access request sent by the terminal is received, perform, according to the terminal information acquired by the acquirer, beamforming for a random access response corresponding to the random access request; and
    a sender, configured to send the random access response for which the beamforming has been performed by the processor to the terminal, wherein the random access response comprises: configuration information of a resource required by the terminal during communication after the terminal hands over from the source cell covered by a source base station to a target cell covered by a target base station;
    wherein the terminal information comprises at least one of the following: (a) location information of the terminal and (b) precoding matrix indication information of the target cell measured by the terminal.

9. The base station according to claim 8, wherein:
the received handover request that is sent by the source base station and comprises the terminal information.

10. The base station according to claim 9,
the base station further comprising:
an allocator, configured to: before the processor performs the beamforming for the random access response, allocate, to the terminal according to the information about the low power node that serves the terminal, the resource required by the terminal during communication after the terminal hands over to the target cell.

11. The base station according to claim 8, wherein:
the sender is further configured to: when information about a low power node that is located in a current cell changes, send second base station configuration update information to a neighboring base station, wherein the second base station configuration update information comprises: current information about the low power node that is currently located in the current cell; and
the base station further comprises: a neighboring base station information receiver, configured to receive first base station configuration update information sent by a neighboring base station, wherein the first base station configuration update information comprises: current information about a low power node that is currently located in a neighboring cell covered by the neighboring base station.

12. A base station, comprising:
an acquirer, configured to acquire terminal information according to a received handover request that includes information about a low power node that is located in a source cell and serves a terminal; and
a sender, configured to send the terminal information acquired by the acquirer to a target base station, to enable the target base station to perform, according to the terminal information, beamforming for a random access response of a terminal that hands over from the source cell covered by a source base station to a target cell covered by the target base station;
wherein the terminal information comprises at least one of the following: (a) location information of the terminal and (b) precoding matrix indication information of the target cell measured by the terminal.

13. The base station according to claim 12, wherein:
the sender is configured to send the handover request to the target base station, wherein the handover request comprises the terminal information.

14. The base station according to claim 13, wherein:
the sender is further configured to: when information about a low power node that is located in a current cell changes, send second base station configuration update information to a neighboring base station, wherein the second base station configuration update information comprises: current information about the low power node that is currently located in the current cell;
and
the base station further comprises: a receiver, configured to receive first base station configuration update information sent by the neighboring base station, wherein the first base station configuration update information comprises: current information about a low power node that is currently located in a neighboring cell covered by the neighboring base station.

15. The base station according to claim 12, further comprising: a receiver, wherein:
the sender is further configured to send a measurement indication that comprises neighboring cell information to the terminal, wherein the measurement indication is used to instruct the terminal to measure precoding matrix indication information of a neighboring cell; and
the receiver is configured to receive the precoding matrix indication information of the neighboring cell measured by the terminal, wherein the neighboring cell comprises the target cell.

\* \* \* \* \*